(12) United States Patent
Yuan et al.

(10) Patent No.: US 10,974,336 B2
(45) Date of Patent: Apr. 13, 2021

(54) METHOD FOR PROFILE MACHINING

(71) Applicant: GENERAL ELECTRIC COMPANY, Schenectady, NY (US)

(72) Inventors: Renwei Yuan, Shanghai (CN); Dong Liu, Shanghai (CN); Lei Li, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 326 days.

(21) Appl. No.: 15/136,023

(22) Filed: Apr. 22, 2016

(65) Prior Publication Data

US 2016/0311044 A1 Oct. 27, 2016

(30) Foreign Application Priority Data

Apr. 24, 2015 (CN) .......................... 201510203599.3

(51) Int. Cl.
*B23K 9/013* (2006.01)
*B23H 7/30* (2006.01)
*B23H 7/26* (2006.01)
*B23H 1/04* (2006.01)
*B23H 1/08* (2006.01)
(Continued)

(52) U.S. Cl.
CPC .............. *B23K 9/013* (2013.01); *B23H 1/04* (2013.01); *B23H 1/08* (2013.01); *B23H 7/265* (2013.01); *B23H 7/30* (2013.01); *B23H 1/00* (2013.01); *B23H 7/26* (2013.01); *B23H 7/28* (2013.01); *B23H 2400/10* (2013.01)

(58) Field of Classification Search
CPC . B23K 9/013; B23H 1/00; B23H 1/04; B23H 1/08; B23H 7/265; B23H 2400/10; B23H 7/26; B23H 7/28; B23H 7/30; B23H 7/32
USPC .... 219/69.11, 13, 15, 17; 205/640, 662, 663
See application file for complete search history.

(56) References Cited

U.S. PATENT DOCUMENTS 3,125,664 A * 3/1964 Pfau .................. B23H 7/28
219/69.2
3,454,738 A 7/1969 Brookshire
(Continued)

FOREIGN PATENT DOCUMENTS

| CN | 86102230 A | 1/1987 |
| CN | 1057419 A | 1/1992 |

(Continued)

OTHER PUBLICATIONS

Translation of WO2014020700A1 (Year: 2014).*
(Continued)

*Primary Examiner* — Erin E McGrath
(74) *Attorney, Agent, or Firm* — Dority & Manning, P.A.

(57) ABSTRACT

A method for profile machining comprises: providing an electrode having an electrode axis, a free axial end with an end face, and a peripheral surface other than the end face; energizing the electrode and a workpiece having a thickness, with one of the workpiece and the electrode as an anode and the other as a cathode; and machining the workpiece with the peripheral surface of the electrode, during which the peripheral surface and the electrode axis of the electrode are across the workpiece in a thickness direction thereof. In addition, an embodiment of present invention relates to a component machined by the method.

5 Claims, 8 Drawing Sheets

(51) Int. Cl.
*B23H 7/28* (2006.01)
*B23H 1/00* (2006.01)

(56) References Cited

U.S. PATENT DOCUMENTS

| | | | | |
|---|---|---|---|---|
| 3,609,280 | A * | 9/1971 | Kholodnov | B23H 1/04 |
| | | | | 219/69.17 |
| 4,005,635 | A | 2/1977 | Feldcamp | |
| 4,386,248 | A | 5/1983 | Inoue | |
| 4,439,660 | A | 3/1984 | Inoue | |
| 4,677,270 | A | 6/1987 | Medici et al. | |
| 5,111,016 | A | 5/1992 | Lodetti et al. | |
| 5,146,061 | A | 9/1992 | Huebler et al. | |
| 5,200,591 | A | 4/1993 | Ohba | |
| 5,804,789 | A | 9/1998 | Saito et al. | |
| 6,680,454 | B1 * | 1/2004 | Batzinger | B23H 1/04 |
| | | | | 205/653 |
| 6,713,706 | B2 | 3/2004 | Akiyoshi et al. | |
| 7,976,694 | B2 | 7/2011 | Trimmer et al. | |
| 7,997,866 | B2 | 8/2011 | Naik et al. | |
| 2004/0200807 | A1 | 10/2004 | Forrester et al. | |
| 2005/0247569 | A1 | 11/2005 | Lamphere et al. | |
| 2012/0285820 | A1 * | 11/2012 | Li | B23H 3/10 |
| | | | | 204/227 |
| 2015/0209883 | A1 * | 7/2015 | Hamada | 219/69.17 |

FOREIGN PATENT DOCUMENTS

| | | | |
|---|---|---|---|
| CN | 103008802 A | 4/2013 | |
| CN | 103801771 A | 5/2014 | |
| DE | 3317034 A1 | 11/1984 | |
| JP | S5463297 U | 5/1979 | |
| JP | H04201019 A | 7/1992 | |
| JP | H10109227 A | 4/1998 | |
| JP | 3750268 B2 | 3/2006 | |
| JP | 2010/017809 A | 1/2010 | |
| JP | 2010/131689 A | 6/2010 | |
| JP | 2012125903 A | 7/2012 | |
| JP | 2013/032782 A | 2/2013 | |
| JP | 2013/527038 A | 6/2013 | |
| WO | 2005018858 A1 | 3/2005 | |
| WO | WO2014020700 A1 * | 2/2014 | B23H 9/10 |

OTHER PUBLICATIONS

Trimmer et al., "BlueArc™ Machining—A High Speed Roughing for Aerospace Alloys", Aeromat 2012, Conference & Exposition, Jun. 18-21, 2012.
European Search Report & Opinion issued in connection with corresponding EP Application No. 16165932.1 dated Sep. 6, 2016.
Unofficial English Translation of Chinese Office Action issued in connection with corresponding CN Application No. 201510203599.3 dated Sep. 21, 2017.
Machine Translated Japanese Search Report Corresponding to Application No. 2016084880 dated Apr. 24, 2020.
Machine Translated Japanese Office Action Corresponding to Application No. 2016084880 dated May 12, 2020.
Japanese Office Action Corresponding to Application No. 2016084880 dated Dec. 14, 2020.

* cited by examiner

METHOD FOR PROFILE MACHINING

CROSS-REFERENCE TO RELATED APPLICATIONS

The present application claims foreign priority benefit under 35 U.S.C. § 119 to commonly-owned Chinese Patent Application No. 201510203599.3 filed 24 Apr. 2015, which is hereby incorporated by reference in its entirety.

FIELD OF THE INVENTION

Embodiments of the present invention relate to methods for profile machining, and particularly to profile machining methods adapted for thin-wall components.

BACKGROUND

A thin-wall component is widely applied in various industrial products because of its advantages of light weight, materials saving, compact structure, and so on, but with relative difficulty in machining. Because of poor rigidity and weak intensity, the thin-wall component is very easily distorted in machining, and thus it is difficult to guarantee machining quality for the component.

In the prior art, the thin-wall component is generally machined in a conventional machining manner, but this manner may produce bigger vibration, impacting component machining accuracy and production efficiency.

In the prior art, the thin-wall component may also be machined in a manner of wire electrical discharge machining (WEDM) or water cutting. However, for some thin-wall components with particular structures, there is a blocker provided in the rear of a workpiece, which makes it difficult to fix the electrode wire of WEDM in the rear of the workpiece, thereby it is difficult to implement the machining manner of WEDM. On the other hand, if the water cutting is used for machining, then the blocker in the rear of the workpiece that does not need to be machined may be very easily destroyed.

Therefore, it is necessary to provide a profile machining method adapted for a thin-wall component to solve the technical problems as described above.

SUMMARY OF THE INVENTION

In view of the technical problems as mentioned above, one aspect of the present invention is to provide a profile machining method. The profile machining method comprises: providing an electrode having an electrode axis, a free axial end with an end face, and a peripheral surface other than the end face; energizing the electrode and a workpiece having a thickness, with one of the workpiece and the electrode as an anode and the other as a cathode; and machining the workpiece with the peripheral surface of the electrode, during which the peripheral surface and the electrode axis of the electrode are across the workpiece in a thickness direction thereof.

Another aspect of the present invention is to provide a component. The component comprises a first portion and a second portion, the first portion having a thickness and at least one machining through-hole passing through the first portion in a thickness direction thereof; the second portion having at least one blocker overlapping the at least one machining through-hole in the thickness direction of the first portion, wherein the machining through-hole on the first portion is formed by machining with an electrode. The electrode has an electrode axis, a free axial end with an end face, and a peripheral surface other than the end face. The steps for machining the first portion comprise: energizing the first portion and the electrode, with one of the first portion and the electrode as an anode and the other as a cathode; and machining the first portion with the peripheral surface of the electrode, during which the peripheral surface and the electrode axis of the electrode are across the first portion in a thickness thereof.

BRIEF DESCRIPTION OF THE DRAWINGS

The present disclosure can be better understood in light of description of embodiments of the present disclosure with reference to the accompanying drawings, in which.

DETAILED DESCRIPTION

One or more specific embodiments of present invention will be described in the following. At First, it should be pointed out that in the detailed description of the embodiments, for the sake of simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the present disclosure are just customary technical means in the art for those of ordinary skilled in the art associated with the contents disclosed in the present disclosure, which should not be regarded as insufficient disclosure of the present disclosure.

Unless defined otherwise, all the technical or scientific terms used in the Claims and the Description should have the same meanings as commonly understood by one of ordinary skilled in the art to which the present disclosure belongs. The terms "first", "second" and the like in the Description and the Claims do not mean any sequential order, quantity or importance, but are only used for distinguishing different components. The terms "a", "an" and the like do not denote a limitation of quantity, but denote the existence of at least one. The term "Or" comprises any one or all of items being listed. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", without excluding other elements or objects. The terms "coupled", "connected" and the like are not limited to being connected physically or mechanically, but may comprise electric connection, no matter directly or indirectly. In addition, "circuit", "circuitry", and "controller" and so on may comprise a single component or a collection of a plurality of active elements or passive elements connected thereamong directly or indirectly, for example, one or more integrated circuit chips, to provide the function corresponding to the description.

The terms "may", "can", "maybe", and the like used in the present invention indicate the possibility that an event happens in some circumstance; have a particular property, feature or function; and/or represent one or more capability, performance, or possibility by being used in combination with a qualified verb. Accordingly, the use of "may" indicates: the terms being modified is obviously suitable, matching or proper for the capability, function or usage as shown; meanwhile when considering the presence of some conditions, the terms being modified may sometimes not be suitable, matching or proper. For example, in some circumstances, it may be anticipated to generate a certain result or performance; while in other circumstances, the result or performance may not be generated. This difference is reflected by the word representing the "possibility".

A specific embodiment of present invention relates to a profile machining method adapted for machining a workpiece having a thickness, to make the workpiece have a preset profile. The profile machining method is usually used to machine a thin-wall component.

Figure 1:
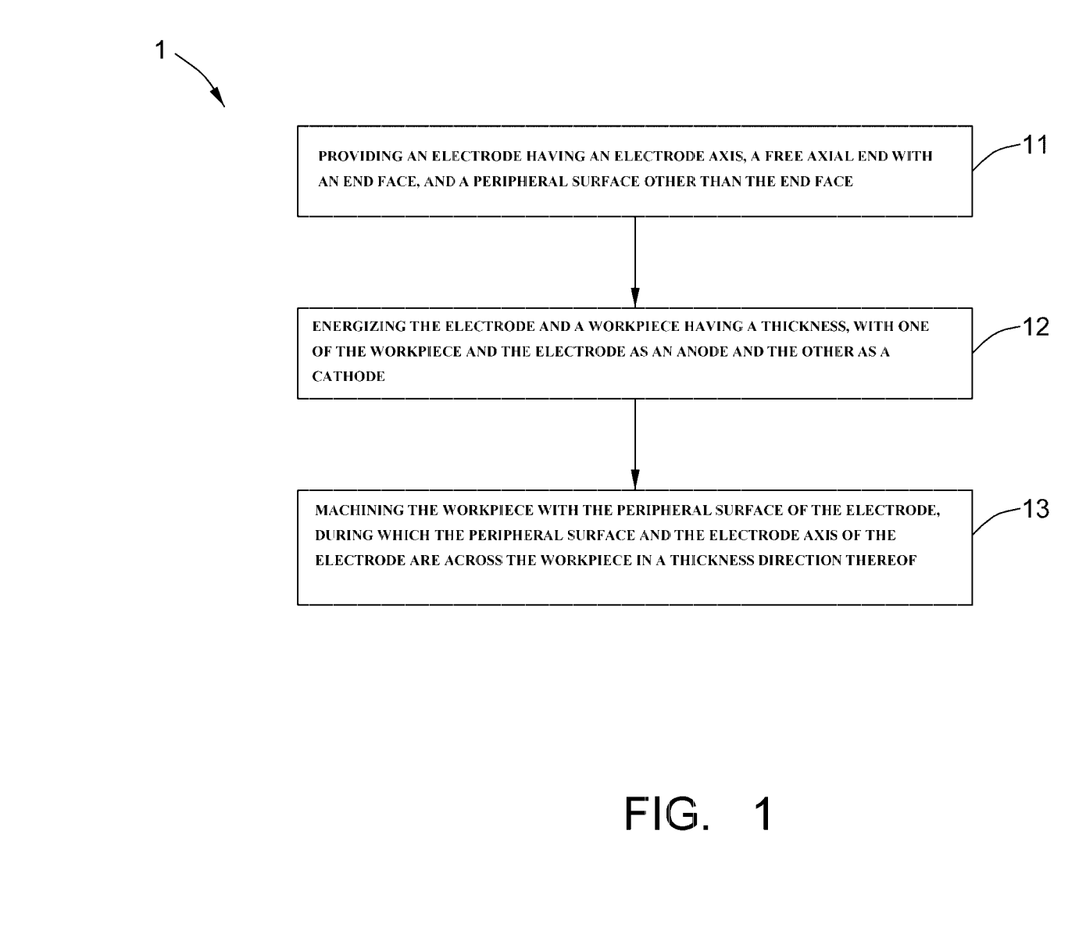
FIG. 1 is a flow chart of a profile machining method according to a specific embodiment of present invention.
Figure 4:
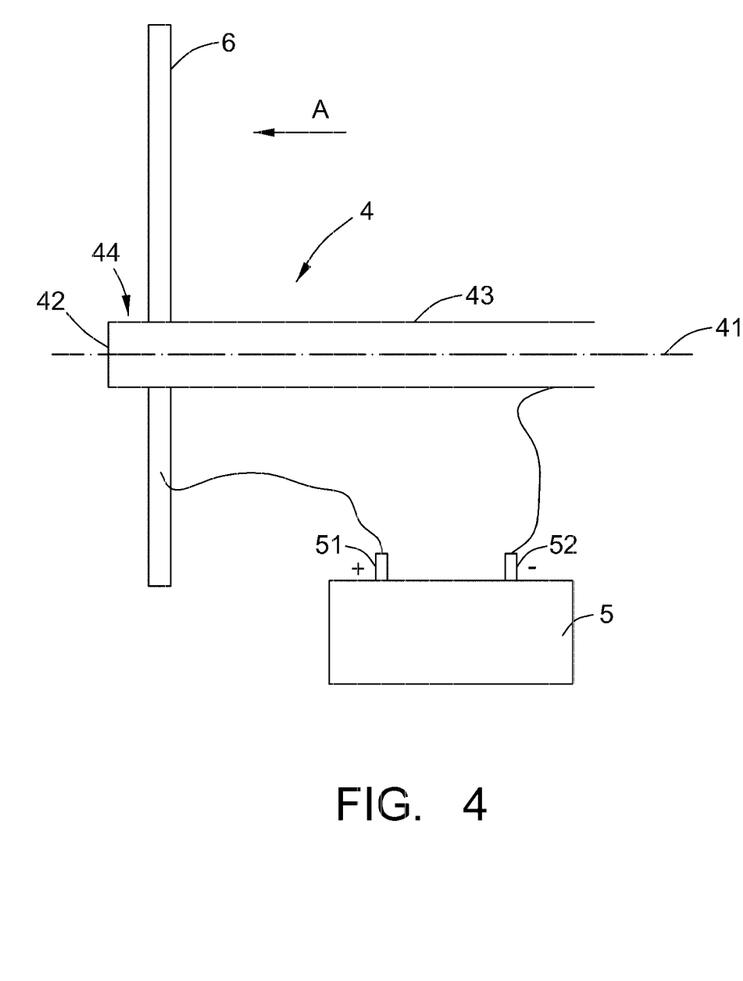
FIG. 4 is a schematic diagram of a profile machining apparatus according to a specific embodiment of present invention.
Figure 5:
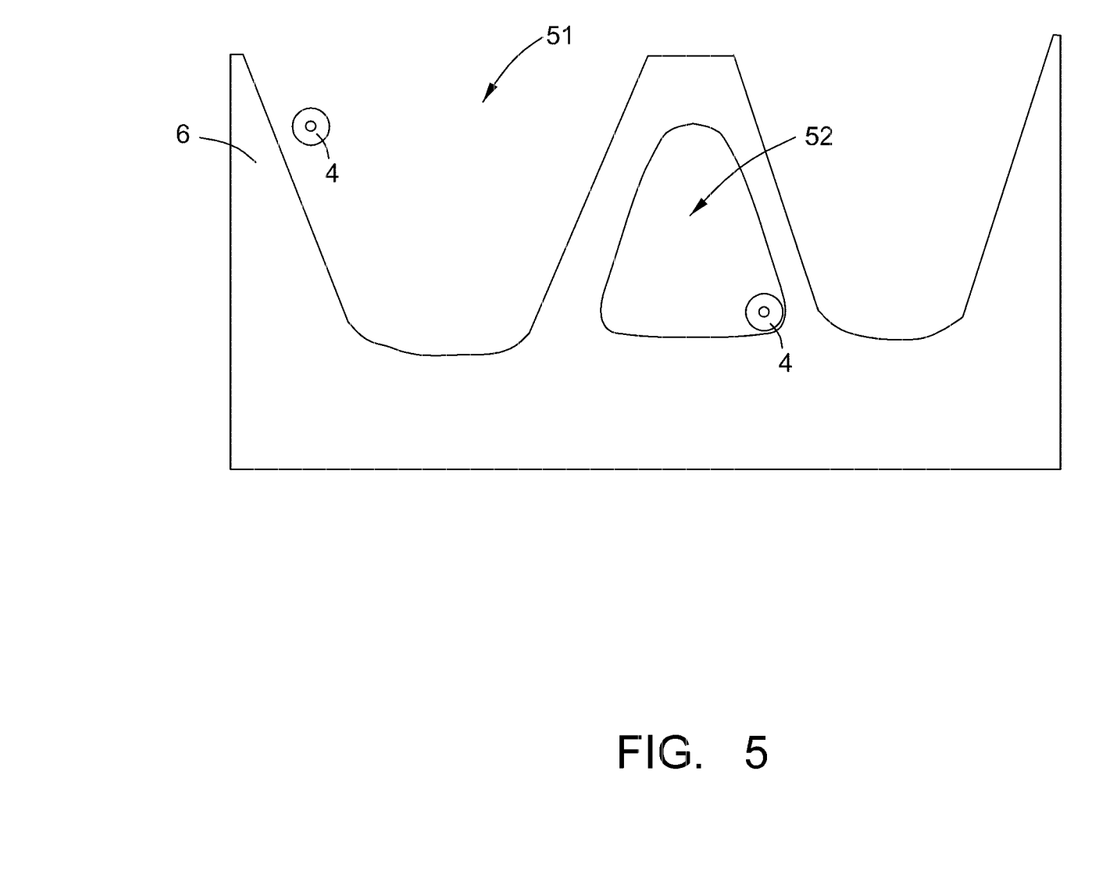
FIG. 5 is a schematic diagram of the profile machining apparatus in the direction A in FIG. 4.

FIG. 1 is a flow chart of a profile machining method 1 according to a specific embodiment of present invention. In step 11, an electrode 4 is provided. With reference to FIG. 4, the electrode 4 has an electrode axis 41, a free axial end 44 with an end face 42, and a peripheral surface 43 other than the end face 42. The peripheral surface 43 surrounds the electrode axis 41. In some embodiments, as shown in FIG. 5, the electrode 4 may be a cylinder with a circular cross section. The peripheral surface 43 is a cylindrical surface.

In step 12, the electrode and a workpiece having a thickness are energized, with one of the workpiece and the electrode as an anode and the other as a cathode. Generally, the electrode and the workpiece are energized by using a power supply with an anode and a cathode. As shown in FIG. 4, a power supply 5 has an anode 51 and a cathode 52. The anode 51 is connected to the workpiece 6 by a wire. The cathode 52 is connected to the electrode 4 by a wire. When the power supply is turned on, the workpiece 6 is positively charged, and the electrode 4 is negatively charged. The dielectric between the electrode 4 and the workpiece 6 may be broken down when they approach each other, and spark discharge occurs immediately, so that part of material on the workpiece 6 is melt or vaporized, generating granular particles. Since the workpiece 6 is machined in this electrocorrosion manner, no direct cutting force is generated between the workpiece 6 and the electrode 4, and thus no vibration is generated, and the workpiece 6 is not easy to be deformed, thereby improving the machining accuracy and machining efficiency for the workpiece.

In step 13, the workpiece 6 is machined with the peripheral surface 43 of the electrode, during which the peripheral surface 43 and the electrode axis 41 of the electrode are across the workpiece in a thickness direction thereof, as shown in FIG. 4. In this way, the peripheral surface 43 of the electrode always faces the workpiece 6 during the machining. More specifically, with reference to FIG. 4 again, during the machining, the free axial end 44 and the other end of the electrode 4 are respectively on opposite sides of the workpiece 6 in a thickness direction thereof, with a portion of the peripheral surface 43 of the electrode 4 facing the workpiece 6. In the embodiment as shown in FIG. 4, the workpiece 6 is a thin-wall component with an uniform thickness, and the electrode 4 is substantially perpendicular to the plane where the workpiece 6 resides. In other embodiments, the electrode 4 may not be perpendicular to the plane where the workpiece 6 resides.

The electrode 4 machines the workpiece 6 by its relative motion with respect to the workpiece 6. In some embodiments, the electrode 4 may move along a preset track to machine the workpiece 6 to obtain a desired profile. The electrode 4 may take a relative movement with respect to the workpiece 6 along a direction substantially perpendicular to the electrode axis 41.

Figure 6:
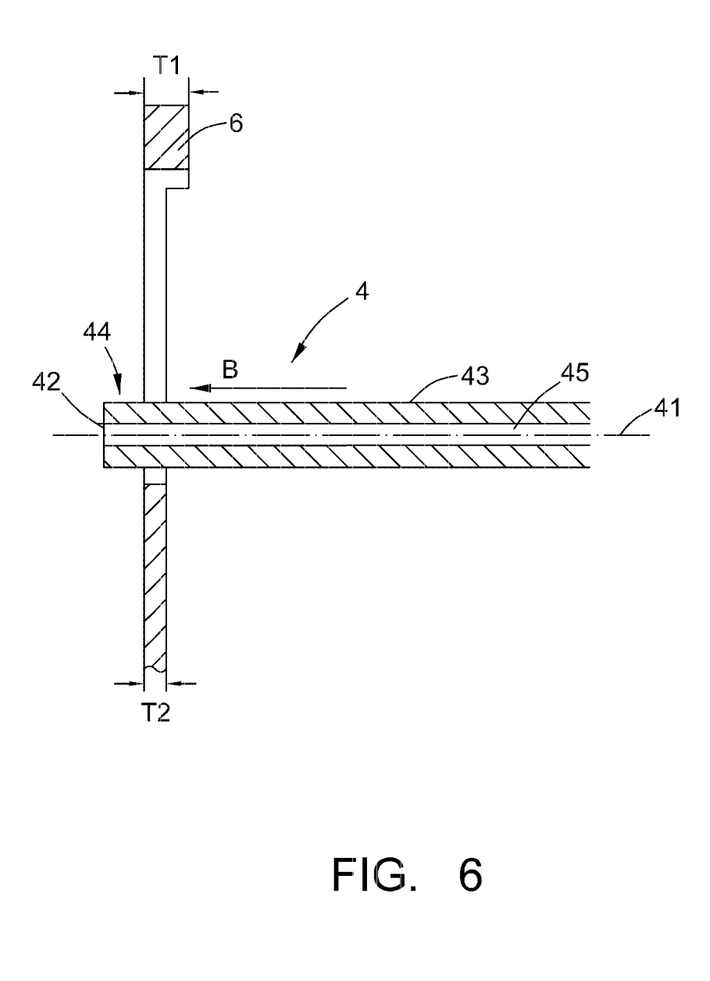
FIG. 6 is a partial sectional view of the profile machining apparatus in FIG. 4.

In some embodiments, as shown in FIG. 6, the thickness of the workpiece 6 is not uniform. A portion of the workpiece 6 may have a larger thickness T1, and another portion of the workpiece may have a smaller thickness T2. When machining this workpiece with non-uniform thickness by the method of the present invention, the peripheral surface 43 of the electrode may be used directly for machining, which is not affected by the thickness variation of the workpiece 6.

Step 13 may comprise the step of removing particles between the workpiece and the electrode. The particles generated by machining may affect the subsequent machining process, and thus the particles need to be removed continuously while machining to further improve the machining efficiency. In some embodiments, the step of removing the particles comprises passing working fluid between the workpiece 6 and the peripheral surface 43 of the electrode. That is, the particles may be removed by providing working fluid between the workpiece 6 and the peripheral surface 43 of the electrode, so that the working fluid flows between the workpiece 6 and the peripheral surface 43 to take away the heat and electrocorrosion product generated during electrocorrosion. In some embodiments, the working fluid is passed along the peripheral surface of the electrode, which can further improve the flushing efficiency. With reference to FIG. 6, the working fluid is passed along the direction B in parallel with the electrode axis 41, and the working fluid flushes the machining point immediately close to the peripheral surface 43 of the electrode 4.

In some embodiments, when a portion to be machined is inside of the workpiece, rather than on the edge of the workpiece, a start through-hole needs to be drilled on the workpiece before the step of machining the workpiece, so that the electrode may pass through the workpiece via the start through-hole to have the peripheral surface and the electrode axis of the electrode be across the workpiece in a thickness direction thereof. The "start through-hole" described herein refers to a through-hole passing through the workpiece in a thickness direction thereof at a machining starting point from which the electrode starts to machine the workpiece. Therefore, the profile machining method 1 may further comprise drilling a start through-hole on the workpiece with the end face 42 of the electrode and passing the electrode 4 through the start through-hole. At this time, a portion of the electrode 4 is within the start through-hole, and two ends of the electrode 4 are respectively on opposite sides of the workpiece in the thickness direction of the workpiece, so that the peripheral surface 43 of the electrode 4 faces the workpiece 6. Then, the workpiece 6 is machined with the peripheral surface 43 of the electrode.

In some embodiments, the step of drilling the start through-hole comprises removing particles between the workpiece 6 and the electrode. In some embodiments, the particles may be removed by providing working fluid between the workpiece and the end face of the electrode, so that the working fluid flows between the workpiece and the end face to take away the heat and electrocorrosion product generated during electrocorrosion.

With reference to FIG. 5, the thin-wall component usually has two types of machining shapes, i.e. an open shape 51 and a closed shape 52. For the open shape 51, the machining may usually start from the edge of the workpiece 6; and for the closed shape 52, the machining needs to start from the interior of the workpiece 6. In an embodiment of the present invention, a start through-hole may be drilled on the workpiece 6 directly with the end face 42 of the electrode 4, then the electrode 4 is disposed into the start through-hole, to machine the workpiece 6 with the peripheral surface 43 of the electrode 4.

Figure 2:
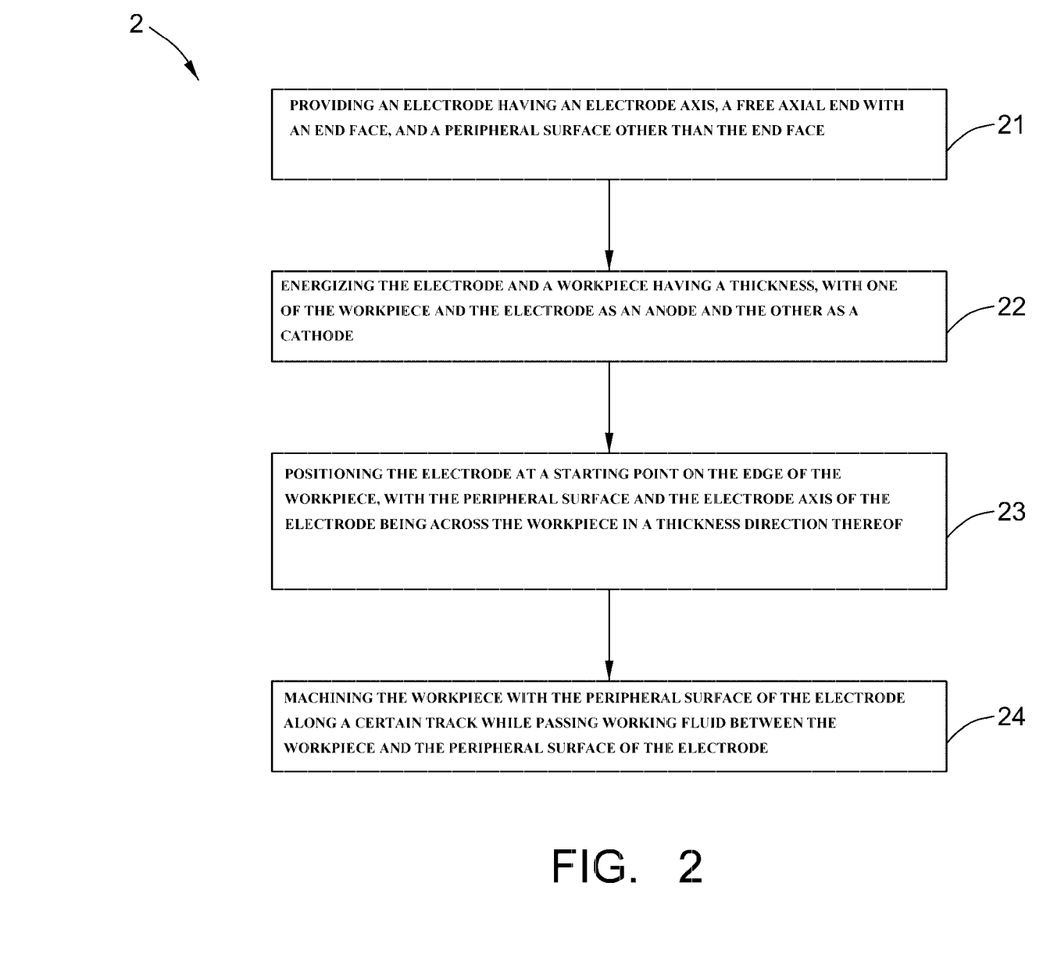
FIG. 2 is a flow chart of a profile machining method according to another specific embodiment of present invention.

FIG. 2 is a flow chart of a profile machining method 2 according to a specific embodiment of present invention. The method in this embodiment is mainly adapted for the machining of the open shape 51.

In step 21, an electrode is provided, the electrode having an electrode axis, a free axial end with an end face, and a peripheral surface other than the end face.

In step 22, the electrode and a workpiece having a thickness are energized, with one of the workpiece and the electrode as an anode and the other as a cathode.

In step 23, the electrode is positioned at a starting point on the edge of the workpiece, with the peripheral surface and the electrode axis of the electrode being across the workpiece in a thickness direction of the workpiece.

In step 24, the workpiece is machined with the peripheral surface of the electrode along a certain track while working fluid is passed between the workpiece and the peripheral surface of the electrode to remove particles between the workpiece and the electrode.

Figure 3:
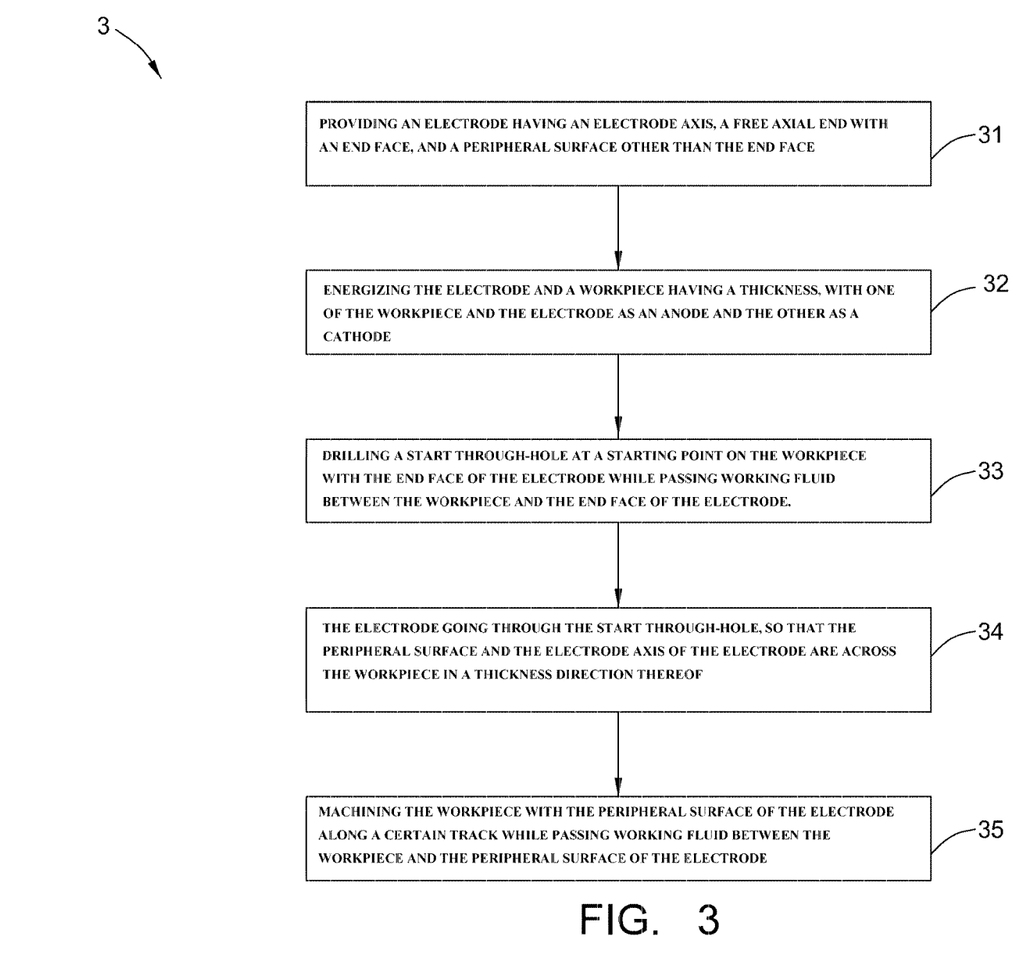
FIG. 3 is a flow chart of a profile machining method according to still another specific embodiment of present invention.

FIG. 3 is a flow chart of a profile machining method 3 according to a specific embodiment of present invention. The method in this embodiment is mainly adapted for the machining of the closed shape 52.

In step 31, an electrode is provided, the electrode having an electrode axis, a free axial end with an end face, and a peripheral surface other than the end face.

In step 32, the electrode and a workpiece are energized, with one of the workpiece and the electrode as an anode and the other as a cathode.

In step 33, a start through-hole is drilled at a starting point on the workpiece with the end face of the electrode while working fluid is passed between the workpiece and the end face of the electrode.

In step 34, the electrode goes through the start through-hole, so that the peripheral surface and the electrode axis of the electrode are across the workpiece in a thickness direction thereof.

In step 35, the workpiece is machined with the peripheral surface of the electrode along a certain track while working fluid is passed between the workpiece and the peripheral surface of the electrode to remove particles between the workpiece and the electrode.

In some embodiments, the step 35 of machining the workpiece comprises rotating the electrode 4 about the electrode axis 41. Since the electrode itself may be corroded or worn down to different extent during the machining of the workpiece with the peripheral surface 43 of the electrode, and it may inevitably affect the machining accuracy of the workpiece over time, rotating the electrode on its own axis may have the peripheral surface of the electrode worn down evenly to reduce the machining error.

In some embodiments, the step 35 of machining the workpiece may further comprise moving the electrode 4 in a direction of the electrode axis 41. When the portion of the electrode 4 interacted with the workpiece 6 is worn down to a certain extent, the worn portion needs to be moved away to have an unused portion on the electrode 4 machine the workpiece 6 continuously. So the electrode 4 is moved in a direction of the electrode axis 41 to have an unused portion on the electrode 4 face the workpiece 6.

With reference to FIG. 6, in some embodiments, the electrode 4 comprises a passage 45 provided inside of the electrode, leading to the end face, and configured to pass the working fluid. Still with reference to FIG. 6, in this embodiment, the passage 45 is in the center of the electrode 4, and the working fluid may be used directly to flush the particles between the end face 42 and the workpiece 6 after flowing out of the central portion of the end face 42. This flushing manner in combination with the external flushing manner may further improve the flushing effect.

Further, a specific embodiment of present invention relates to a component machined by the above-mentioned profile machining method. The component comprises a first portion, having a thickness and at least one machining through-hole thereon, the at least one machining through-hole passing through the first portion in a thickness direction thereof; The component further comprises a second portion having at least one blocker overlapping the at least one machining through-hole in the thickness direction of the first portion, wherein the machining through-hole is machined with an electrode by the above-mentioned profile machining method. The electrode has an electrode axis, a free axial end with an end face, and a peripheral surface other than the end face. The steps for machining the first portion comprise: energizing the first portion and the electrode, with one of the first portion and the electrode as an anode and the other as a cathode; and machining the first portion with the peripheral surface of the electrode, during which the peripheral surface and the electrode axis of the electrode are across the first portion in a thickness direction thereof.

"Machining through-hole" as described herein refers to a profile or shape formed on the workpiece by removing part of material of the workpiece, which may be of an open shape, for example, the open through-hole 51 as shown in FIG. 5, and may also be of a closed shape, for example, the closed through-hole 52 as shown in FIG. 5.

Figure 7:
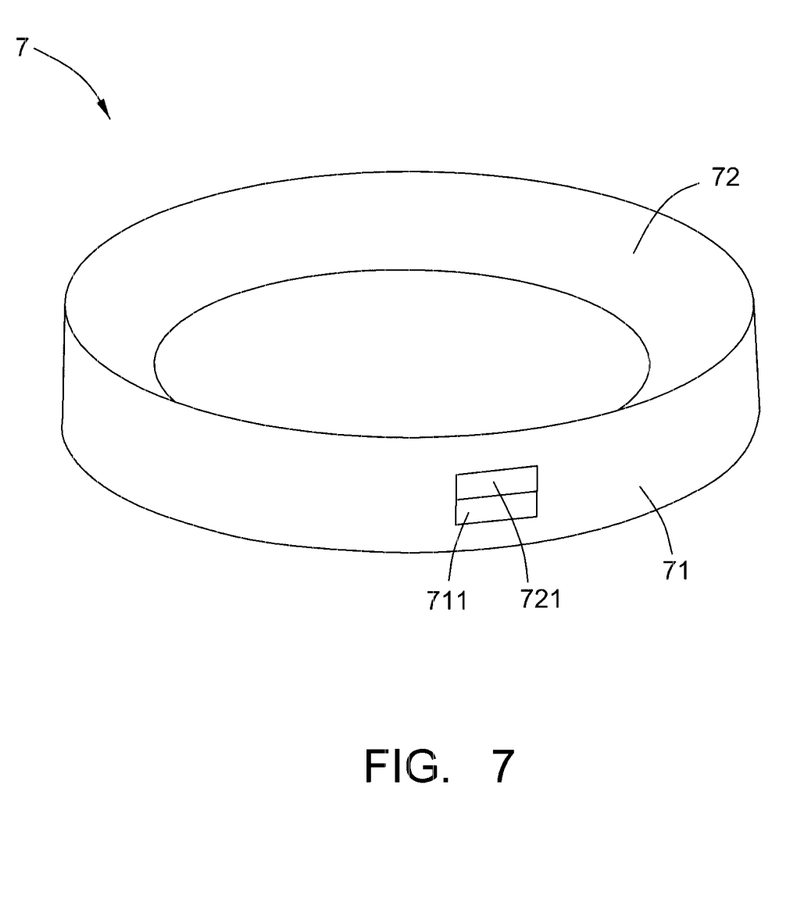
FIG. 7 is a schematic diagram of a component machined by the profile machining method according to a specific embodiment of present invention.
Figure 8:
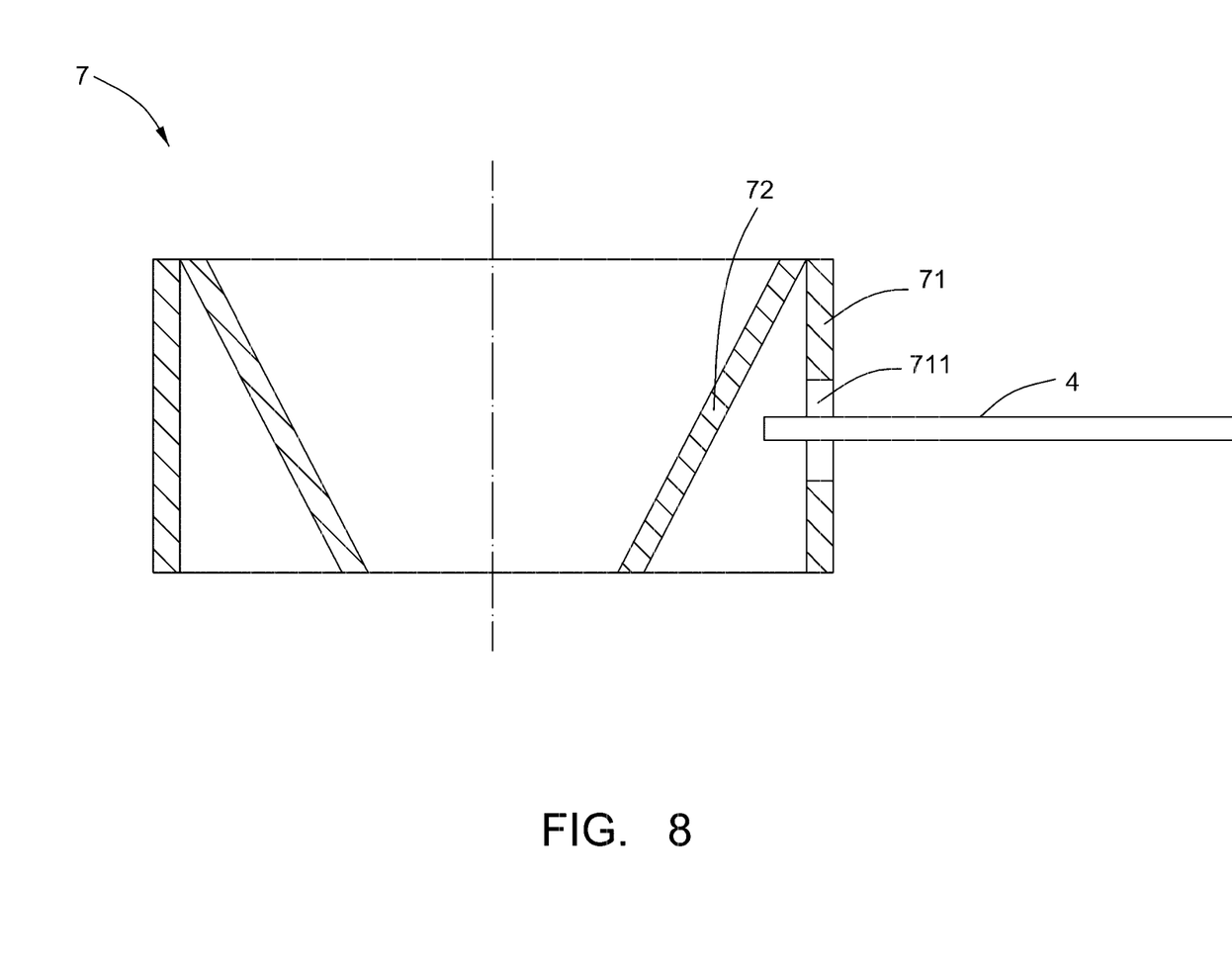
FIG. 8 is a sectional view of the component of FIG. 7.

With reference to FIGS. 7 and 8, in some embodiments, the component 7 may be a ring with two-layer structure. The component 7 comprises an outer layer 71 and an inner layer 72. The outer layer 71 has a thickness and at least one machining through-hole passing through the outer layer its thickness direction; the inner layer 72 is disposed at an inner side of the outer layer 71 in the thickness direction of the outer layer, and has at least one blocker 721 to overlap the at least one machining through-hole 711 from the inner side, wherein, the machining through-hole 711 is formed by machining with the peripheral surface of the electrode 4, during which the peripheral surface and the electrode axis of the electrode 4 are across the outer layer in the thickness direction thereof.

In some embodiments, as shown in FIG. 8, the blocker 721 and the second portion are integrated in one body.

In some embodiments, the step of machining the machining through-hole 711 further comprises drilling a start through-hole on the outer layer 71 with the end face of the electrode 4 and passing the electrode 4 through the start through-hole.

Although the present invention has been set forth in combination with specific embodiments, the person skilled in the art shall understand that many modifications and variations may be made to the present invention. Therefore, it should be recognized that the intention of the claims is to cover all these modifications and variations within the real concept and range of the present invention.

What is claimed is:

1. A method for profile machining a workpiece, the method comprising:
   providing an electrode having:
      an electrode axis;
      a first axial end with an end face;
      a passage therein leading to the end face;
      a second axial end opposite to the first axial end; and
      a peripheral surface other than the end face; and
   energizing one of a workpiece and the electrode as an anode and the other as a cathode, the workpiece being a thin-walled ring with a uniform thickness and having an outer layer, an inner layer, and a space between the outer and inner layers, wherein the outer layer comprises opposite sides and a thickness between the opposite sides; and
   machining the outer layer of the workpiece with the peripheral surface of the electrode without machining the inner layer of the workpiece, during which the peripheral surface and the electrode axis of the electrode are across the thickness, such that the first and second ends of the electrode are positioned on opposite sides of the outer layer of the workpiece, respectively, along a direction of the thickness of the outer layer of the workpiece;
   wherein machining the outer layer of the workpiece further comprises:
      passing a first portion of working fluid through the passage of the electrode;
      passing a second portion of working fluid between the workpiece and the peripheral surface of the electrode;
      wherein the first portion of working fluid and the second portion of working fluid are both passed in a direction that is parallel to the electrode axis;
      rotating the electrode at least 360 degrees on the electrode axis such that the peripheral surface of the electrode is worn down evenly in a circumferential direction; and
      moving the electrode in a direction of the electrode axis to have an unused portion on the electrode face the workpiece.

2. The method according to claim 1, wherein the machining comprises removing particles between the workpiece and the electrode.

3. The method according to claim 1, further comprising drilling a start through-hole on the workpiece with the end face of the electrode and passing the electrode through the start through-hole.

4. The method according to claim 3, wherein the drilling comprises removing particles between the workpiece and the electrode.

5. The method according to claim 4, wherein the removing comprises passing the first portion of working fluid between the workpiece and the end face of the electrode.

* * * * *